(12) United States Patent
Boucadair et al.

(10) Patent No.: US 12,206,642 B2
(45) Date of Patent: Jan. 21, 2025

(54) METHOD FOR SENDING AN INFORMATION ITEM AND FOR RECEIVING AN INFORMATION ITEM FOR THE REPUTATION MANAGEMENT OF AN IP RESOURCE

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/051,956

(22) PCT Filed: Apr. 24, 2019

(86) PCT No.: PCT/FR2019/050967
§ 371 (c)(1),
(2) Date: Oct. 30, 2020

(87) PCT Pub. No.: WO2019/211548
PCT Pub. Date: Nov. 7, 2019

(65) Prior Publication Data
US 2021/0136030 A1    May 6, 2021

(30) Foreign Application Priority Data
May 2, 2018    (FR) ..................... 1800400

(51) Int. Cl.
*H04L 61/5014*    (2022.01)
*H04L 9/40*    (2022.01)
(Continued)

(52) U.S. Cl.
CPC ...... *H04L 61/5014* (2022.05); *H04L 61/5061* (2022.05); *H04L 63/14* (2013.01);
(Continued)

(58) Field of Classification Search
None
See application file for complete search history.

(56) References Cited

U.S. PATENT DOCUMENTS 7,916,729 B2 * 3/2011 Mohapatra .......... H04L 12/4641
370/252
10,432,503 B1 * 10/2019 Rzehak ................... H04L 69/04
(Continued)

FOREIGN PATENT DOCUMENTS

CN   103117864 B * 7/2016
WO   WO-2014058488 A1 * 4/2014 ............. H04L 41/08

OTHER PUBLICATIONS

English translation of the Written Opinion of the International Searching Authority dated Jun. 27, 2019 for corresponding International Application No. PCT/FR2019/050967, filed Apr. 24, 2019.
(Continued)

*Primary Examiner* — Younes Naji
(74) *Attorney, Agent, or Firm* — David D. Brush; Westman, Champlin & Koehler, P.A.

(57) ABSTRACT

A method for sending an information item allows reputation management of IP resources in a set of networks including at least a first network and a second network. The method is implemented by a device of the first network, called an "emitter device", an includes a step in which the emitter device sends to a device of the second network, called a "receiver device", an information item representative of a prefix size of an IP address assigned to an equipment item connected to the first network.

19 Claims, 5 Drawing Sheets

(51) Int. Cl.
*H04L 61/5061* (2022.01)
*H04L 67/288* (2022.01)
*H04L 69/08* (2022.01)

(52) U.S. Cl.
CPC ............ *H04L 63/20* (2013.01); *H04L 67/288* (2013.01); *H04L 69/08* (2013.01)

(56) References Cited

U.S. PATENT DOCUMENTS

| | | | | |
|---|---|---|---|---|
| 2007/0162587 A1* | 7/2007 | Lund | ............ | G06Q 10/107 709/223 |
| 2010/0057895 A1 | 3/2010 | Huang | | |
| 2012/0314705 A1* | 12/2012 | Howard | ............ | H04L 45/00 370/390 |
| 2013/0177019 A1* | 7/2013 | Zhang | ............ | H04L 45/54 370/392 |
| 2014/0143825 A1* | 5/2014 | Behrendt | ............ | G06F 21/552 726/1 |
| 2015/0047043 A1* | 2/2015 | Serban | ............ | H04L 63/1425 726/23 |
| 2016/0088021 A1* | 3/2016 | Jayanti Venkata | .... | H04L 63/104 726/1 |
| 2016/0261707 A1 | 9/2016 | Rajagopalan et al. | | |
| 2018/0139685 A1* | 5/2018 | Wei | ............ | H04W 8/087 |

OTHER PUBLICATIONS

International Search Report dated Jun. 10, 2019 for corresponding International Application No. PCT/FR2019/050967, filed Apr. 24, 2019.
Written Opinion of the International Searching Authority dated Jun. 10, 2019 for corresponding International Application No. PCT/FR2019/050967, filed Apr. 24, 2019.
French Search Report dated Feb. 14, 2019 for corresponding French Application No. 1800400, filed May 2, 2018.
R. Hinden et al., "IP Version 6 Addressing Architecture", Request for Comments: 4291, dated Feb. 2006.
T. Narten et al., "Privacy Extensions for Stateless Address Autoconfiguration in IPV6", Request for Comments: 4941, dated Sep. 2007.

* cited by examiner

METHOD FOR SENDING AN INFORMATION ITEM AND FOR RECEIVING AN INFORMATION ITEM FOR THE REPUTATION MANAGEMENT OF AN IP RESOURCE

CROSS-REFERENCE TO RELATED APPLICATIONS

This Application is a Section 371 National Stage Application of International Application No. PCT/FR2019/050967, filed Apr. 24, 2019, which is incorporated by reference in its entirety and published as WO 2019/211548 A1 on Nov. 7, 2019, not in English.

BACKGROUND OF THE INVENTION

The invention relates to the general field of telecommunications.

It relates more particularly to the management of IP resources used to identify equipment items composing a network as well as equipment items connected to such a network.

In particular, managing IP resources may involve implementing one or more IP resource reputation systems responsible for preventing the spread of malicious traffic that would use one of those IP resources, for example.

An IP resource can be an IP address or a prefix of an IP address.

It is recalled that an IP resource reputation system is a system that keeps a track reflecting the reputation of IP addresses or prefixes based on the past suspicious activity of machines having emitted traffic with these addresses used as source IP addresses. For this purpose, such a system can be composed of one or more servers, and host a database including a list of IP resources and information items about their reputation. Such a system may disclose, spontaneously or upon request, a history reflecting said activity.

IP resources are typically allocated by service providers or network operators. Alternatively, the allocation of IP addresses or prefixes can be ensured by an Internet Service Provider (ISP), service provider, or operator.

Content providers can refer to a reputation system to decide whether or not to serve a machine identified by at least one IP address based on the history reflecting the activity of that IP address and as maintained by a reputation system.

A reputation system can be reduced to a database, such as a blacklist, listing the IP addresses associated with machines infected with viruses or having been at the origin of illicit activity such as sending SPAM e-mails, fraudulent traffic, or Denial of Service (DoS) traffic.

When a reputation system registers an IP address, associated with a first machine, as an address with a bad reputation, a content provider that interfaces with this reputation system may decide to execute an action relating to the IP address used by said first machine and which would attempt to access the content of said provider.

For example, the action may consist in blocking all or part of the communications from this first machine, or in redirecting its communications to a dedicated portal.

Thus, if the same IP address is subsequently allocated to a second machine, that second machine will undergo the action executed by the content provider, even if this second machine is not infected and has not generated fraudulent traffic. The experience quality of the user of the second machine is further degraded if this IP address is registered with multiple reputation systems.

The content provider can apply a filter on the full IP address, encoded in 32 bits in case of an IPv4 address, or 128 bits in case of an IPv6 address.

The service provider who allocated the IP address to the second machine is not aware of the degraded experience of his/her customer who owns the second machine, since it is the content provider who has chosen to execute an action likely to block the traffic coming from the second machine; the service provider is therefore not able to anticipate such a degradation of service in order to prevent it from happening again for other customers.

The situation can be complicated if several addresses are allocated to the first infected machine, all these addresses are then polluted. It should be recalled that a block of addresses of a service provider is said to be "polluted" if several addresses of this block are present in a blacklist logged in a database maintained by a reputation system.

There is therefore a problem of being able to block communications from an equipment item (device) connected to a network without affecting the experience quality perceived by the user of another equipment item that may use the same source IP address.

This problem occurs regardless of the IPv4 or IPv6 addressing format.

Additional problems arise in the case of IPv6 addressing. The structure of an IPv6 address is described in RFC 4291.

A filtering performed by the content provider based on the 128-bit coded IPv6 address can be easily bypassed by a malicious user. Indeed, it suffices for a malicious user to generate a new IPv6 address from a prefix which has been delegated to him by his service provider, for example by using the resources of the algorithm defined in RFC 4941 and which allows to randomly generate the value of the 64 bits of the address which form the Interface Identifier IID.

A solution allowing the blocking of a malicious equipment item without affecting the experience quality of other equipment items is known, and which consists in that the content provider activates a filter based on the IPv6 prefix, and not on the full IPv6 address as above.

This solution has the disadvantage of its difficulty of implementation. Indeed, a content provider does not have reliable information items to deterministically calculate the IPv6 prefix associated with an IPv6 address.

An IPv6 packet does not reveal the size of the IPv6 prefix allocated to a machine. This information item is only visible to the service provider that allocated the IPv6 prefix, and to the machine that received the network prefix from that provider. However, the same IPv6 address can be obtained by using prefixes of different sizes.

In addition, the size of the IPv6 prefixes allocated to the machines which are connected to the network of the operator or of the service provider, for example to CPE (for "Customer Premises Equipment") equipment items, comes under a policy characteristic of the IPv6 connectivity service provided by each service provider: there is no standard or imposed size for the IPv6 prefixes allocated by these providers to customers.

Furthermore, the size of these prefixes can also vary depending on the service provided by an operator: for example, an IPv6 connectivity service provided to a company can be based on the allocation of a prefix of size /48 (also called of length /48), that is to say a prefix with a length of 48 bits, while the IPv6 connectivity service provided to a residential customer may be based on the allocation of a prefix of length /56, that is to say with a length of 56 bits.

There is therefore a need for a solution allowing better identification of the prefix size allocated to a machine, and which does not have the disadvantages of existing solutions.

Object and Summary of the Invention

The invention aims at a method for sending an information item allowing reputation management of IP resources in a set of networks comprising at least a first network and a second network. The method being implemented by a device of the first network, called "emitter device", it is characterized in that it includes a step in which the emitter device sends, to a device of the second network, called "receiver device", an information item representative of a prefix size of an IP address assigned to an equipment item connected to the first network.

In one embodiment, the information item representative of the prefix size sent is used for the reputation management of IP resources implemented in the set of networks.

The features and advantages of the method for sending an information item according to the invention presented below apply in the same way to the method for receiving an information item, to the emitter device and to the receiver device according to the invention.

Within the meaning of the invention, the IP address assigned to the equipment item connected to the first network can be an address allocated directly to the equipment item or used by an address or prefix translation mechanism.

In one embodiment, the IP address (or prefix) is allocated by a residential gateway, by a CPE equipment item or by an STB (for "Set Top Box") decoder.

In another embodiment, the IP address is assigned by an address translation mechanism of NAT (for "Network Address Translation") type or of NPTv6 (for "IPv6 Network Prefix Translation") type.

The first and second networks can be operated by the same operator or by different operators.

In one embodiment, the first or the second network is a local network, for example a home network or an enterprise network.

In one embodiment, the first or the second network is a content host network.

The first and the second network can be operated by separate entities.

In one embodiment, the first and the second network are autonomous systems.

It is recalled that an Autonomous System AS is a set of IP routers placed under the responsibility of operating of a single administrative entity, typically an IP network operator or an IP service provider.

In one embodiment, the information item representative of the prefix size is the size itself. In another embodiment, this information item is obtained by a processing carried out on the size, for example a hash. This hash as well as an integrity control are used in some embodiments to prevent fraudulent insertion of identification information items.

Knowing the prefix size of the IP address assigned to the equipment item, this equipment item can be identified unambiguously.

Thanks to the invention, it is possible to execute an action against a malicious equipment item without affecting the experience quality of another equipment item connected to the network.

In one embodiment, the IP address is an IPv4 address or an IPv6 address.

In one embodiment, the method for sending an information item further includes a step in which the emitter device sends, to the receiver device, an information item representative of a duration of assignment of the prefix.

A defined action against a malicious equipment item can be executed if the address assigned to the equipment item continues to be on a blacklist maintained by an IP resource reputation system. Said action may consist, for example, in setting up a filter whose duration of validity matches the duration of assignment of the prefix. More specifically, the filter will be valid as long as the address is in a blacklist.

In one embodiment, the method for sending an information item further includes a step in which the emitter device sends, to the receiver device, an information item representative of an identifier of an IP resource reputation server of the first network, the server being configured to manage at least one list of IP resources associated with equipment items connected to the first network.

Thus, any action defined against the equipment item can be notified by the reputation system to the network operating entity from which the equipment item has obtained its IP address. It is then possible to avoid a degradation of service within the first network by avoiding assigning an IP resource identical to that of the equipment item concerned by the action, to another equipment item.

In one embodiment, said emitter and receiver devices are routers communicating according to one of the BGP (Border Gateway Protocol) or BGPSEC (Border Gateway Protocol Security) protocols, and construct a table including at least one information item representative of the prefix size of an IP address.

Correspondingly, the invention relates to a device of a first network, called "emitter device", the first network being capable of reaching a second network, the emitter device being characterized in that it is configured to send, to a device of the second network, an information item representative of a prefix size of an IP address assigned to an equipment item connected to the first network.

The emitter device according to the invention can implement the method for sending an information item according to the invention.

In one embodiment, the emitter device is a server or network equipment item, for example a router.

Correspondingly, the invention relates to a method for receiving an information item allowing a reputation management of IP resources in a set of networks comprising at least a first network and a second network and implementing a reputation management of IP resources, the method being implemented by a device of the set of networks, called a "receiver device", and characterized in that it includes the steps of:

obtaining an information item representative of a prefix size of an IP address assigned to an equipment item connected to the first network; and executing an action defined depending on the size.

In one embodiment, the first and the second network are operated by two separate entities.

In one embodiment, the action is at least one action from:

an addition of an IP resource associated with the equipment item to a blacklist or to a whitelist, said IP resource being the prefix or the IP address;

a removal of the IP resource associated with the equipment item from a blacklist or a whitelist;

a limitation of traffic exchanged with the equipment item;

a redirection of communications involving the IP resource associated with the equipment item to a dedicated portal; and an update of a routing or IP resource reputation table.

In one embodiment, the method for receiving an information item further includes, following the step of executing an action, a step of canceling an effect of the action, this canceling step being triggered upon expiration of a lifetime of the action or upon reception of a request from a device configured for a reputation management of IP resources.

In one embodiment, the step of canceling an effect of the action is preceded by steps of requesting and receiving at least one additional information item from the device configured for a reputation management of IP resources.

Said additional information item may be useful in checking the authenticity of the information item representative of the size.

In one embodiment, the receiver device further obtains at least one information item from:
- the IP address of the equipment item;
- an information item representative of the duration of assignment of the prefix;
- an identifier of an IP resource reputation server of the first network, the server being configured to manage at least one list of IP resources associated with equipment items connected to the first network;
- a code for identifying an action already performed by another device;
- a reason for the action already performed by another device;
- a list of IP resources associated with a filter; and
- a timestamp information item on the assignment of the IP address of the equipment item.

Obtaining the list of IP resources associated with a filter can be used to update a routing table or a table relating to an IP resource reputation system. The filter can use an IP address, a prefix, and/or a network identifier.

Correspondingly, the invention relates to a device of a set of networks, called "receiver device", said set of networks comprising at least a first network and a second network, the receiver device being characterized in that it is configured for:
obtaining an information item representative of a prefix size of an IP address assigned to equipment item connected to the first network; and
executing an action defined depending on the size of said prefix.

The receiver device according to the invention can implement the method for receiving an information item in accordance with the invention.

The receiver device in accordance with the invention obtains the information item representative of the prefix size, this information item having been sent by the emitter device in accordance with the invention.

In one embodiment, the receiver device is a network equipment item of the second network, or a server of an IP resources reputation system of the set of networks, or an IP resources reputation server of the first network.

The invention also relates to a first computer program on a recording medium, this program being capable of being implemented in a device, called "emitter device", such as a server or network equipment item. This program includes instructions adapted to the implementation of a method for sending an information item as described above.

The invention also relates to a second computer program on a recording medium, this program being capable of being implemented in a device called "receiver device", such as a server or a network equipment item. This second program includes instructions adapted to the implementation of a method for receiving an information item as described above.

Each of these programs can use any programming language, and be in the form of a source code, object code, or a code intermediate between source code and object code, such as in a partially compiled form, or in any other desirable form.

The invention also relates to information item or recording media which are readable by a computer, and including instructions for computer programs as mentioned above.

The information item or recording media can be any entity or device capable of storing programs. For example, the media can include a storage means, such as a ROM, for example a CD ROM or a microelectronic circuit ROM, or else a magnetic recording means, for example a floppy disc or a hard disc, or a flash memory.

On the other hand, the information item or recording media can be transmissible media such as an electrical or optical signal, which can be routed via an electrical or optical cable, by radio link, by wireless optical link or by other means. The programs according to the invention may in particular be downloaded from an Internet type network.

Alternatively, each information item or recording medium can be an integrated circuit in which one of the programs is incorporated, the circuit being adapted to execute or to be used in the execution of the method in question.

BRIEF DESCRIPTION OF THE DRAWINGS

Other features and advantages of the present invention will emerge from the description given below, with reference to the appended drawings which illustrate an exemplary embodiment thereof without any limiting nature. In the figures.

DETAILED DESCRIPTION

Figure 1:
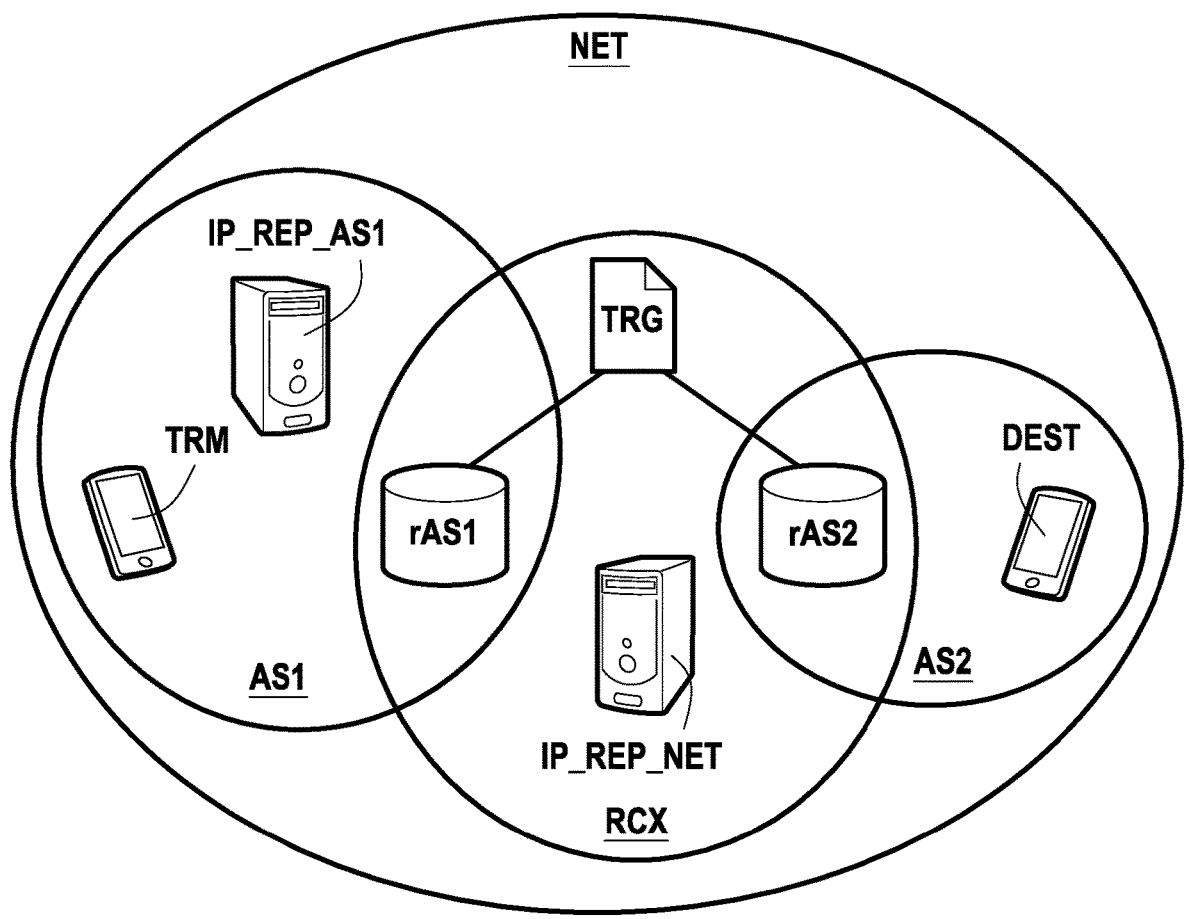
FIG. 1 illustrates a network in which a method for sending an information item and a method for receiving an information item in accordance with the invention can be implemented in a particular embodiment.

FIG. 1 shows a set of networks NET in which a method for sending and a method for receiving an information item, in accordance with the invention, are implemented, said information item being able to be advantageously used for IP resource reputation management.

In this embodiment, the set of networks NET is managed by several operators: the set of networks NET includes a first network AS1 managed by a first operator OP1 and a second network AS2 managed by a second operator OP2. The first network AS1 and the second network AS2 are connected to each other via an interconnection network RCX, for example the Internet.

In this embodiment, the communications between the two networks AS1 and AS2 pass through at least one intermediate node. Each network AS1, AS2 includes at least one interconnection router rAS1, rAS2.

The set of networks NET includes a global routing table TRG managed by the interconnection routers rAS1 and rAS2.

It is recalled that a routing table TRG maintains all the known and available routes and as advertised by the routers of the first and second network.

The routing table TRG can include, for each network AS1, AS2, a list of prefixes advertised by this network AS1, AS2.

According to this embodiment, the routing table TRG additionally includes, for each network AS1, AS2, at least one information item descriptive of at least one prefix size as allocated to at least one equipment item connected to this network AS1, AS2.

An equipment item TRM is connected to the first network AS1. Its IP address associated within the first network AS1 is derived from a prefix of size T.

The router rAS1 is configured to send this size T to a receiver device of the second network AS2, for example the router rAS2 or a content server DEST.

The set of networks NET includes at least one device, hereinafter called "network reputation system" and denoted IP_REP_NET, allowing the implementation of a reputation policy for IP resources within the network NET.

The reputation system IP_REP_NET includes one or more servers. A single server is shown in FIG. 1.

The reputation system IP_REP_NET hosts a database that includes a list of IP resources assigned within the network NET and information items about the reputation of those IP resources. It is recalled that an IP resource can be a prefix or an IP address.

In this embodiment, the database hosted by the IP resource reputation system of the network NET, IP_REP_NET, is a list called "blacklist" which records IP resources identified as source IP addresses of machines connected to the network NET, but infected by viruses or having generated illicit activities such as sending spams or having been involved in the implementation of an attack, for example of the DoS (Denial of Service) type, intended for one or more other target machines.

A machine connected to the network NET means a network equipment item, such as a switch or a router, or a user equipment item such as a telephone terminal, tablet or computer.

In this embodiment, the first network AS1 includes a network device, hereinafter called the IP resource reputation server of the first network AS1 and denoted IP_REP_AS1, configured for the reputation management of the IP resources associated with equipment items connected to the first network AS1.

The reputation server IP_REP_AS1 receives and manages notifications relating to the reputation of IP resources associated with equipment items connected to the first network AS1. It is also responsible for contacting the reputation systems to retrieve the list of resources for which it is responsible.

The second network AS2 can also include a reputation server configured to manage the reputation of IP resources of the second network AS2.

The server IP_REP_AS1 is identified by an identifier, such as an IP address, an e-mail address, a URI or a domain name, for example according to the DNS (Domain Name System) formalism.

In this embodiment, the reputation server IP_REP_AS1 is configured to receive or send messages from or to the network reputation system IP_REP_NET or other reputation servers of other networks.

The network reputation system IP_REP_NET is configured to receive requests from reputation servers comprised in the network NET, for example the server IP_REP_AS1, to execute some actions such as removing an IP resource from a blacklist.

In this embodiment, at least one server of the reputation system IP_REP_NET of IP resources of the set of networks NET is also configured to send to the reputation servers of IP resources associated within a network of the set NET, for example IP_REP_AS1, upon consultation or after a modification of the content of its own database, information item messages about its database.

In this embodiment, a network equipment item DEST is connected to the network NET via the second network AS2. The equipment item DEST then has a source IP address assigned by the operator OP2. In this embodiment, the equipment item DEST is a content server, for example a server that hosts a website, or a database.

Each of the IP addresses of the first equipment item TRM and of the server DEST can be an IPv4 address or an IPv6 address.

Subsequently, and by way of examples, embodiments where the methods of the invention are implemented in an IP network activating the BGPSEC protocol or the BGP protocol and able in particular to implement IP communications, are described.

Implementation of the Methods of the Invention in a Network Activating the BGPSEC Protocol In one embodiment, the method for sending an information item and the method for receiving an information item, in accordance with the invention and allowing the reputation management of IP resources, are implemented in a network using the BGPSEC protocol.

Figure 2:
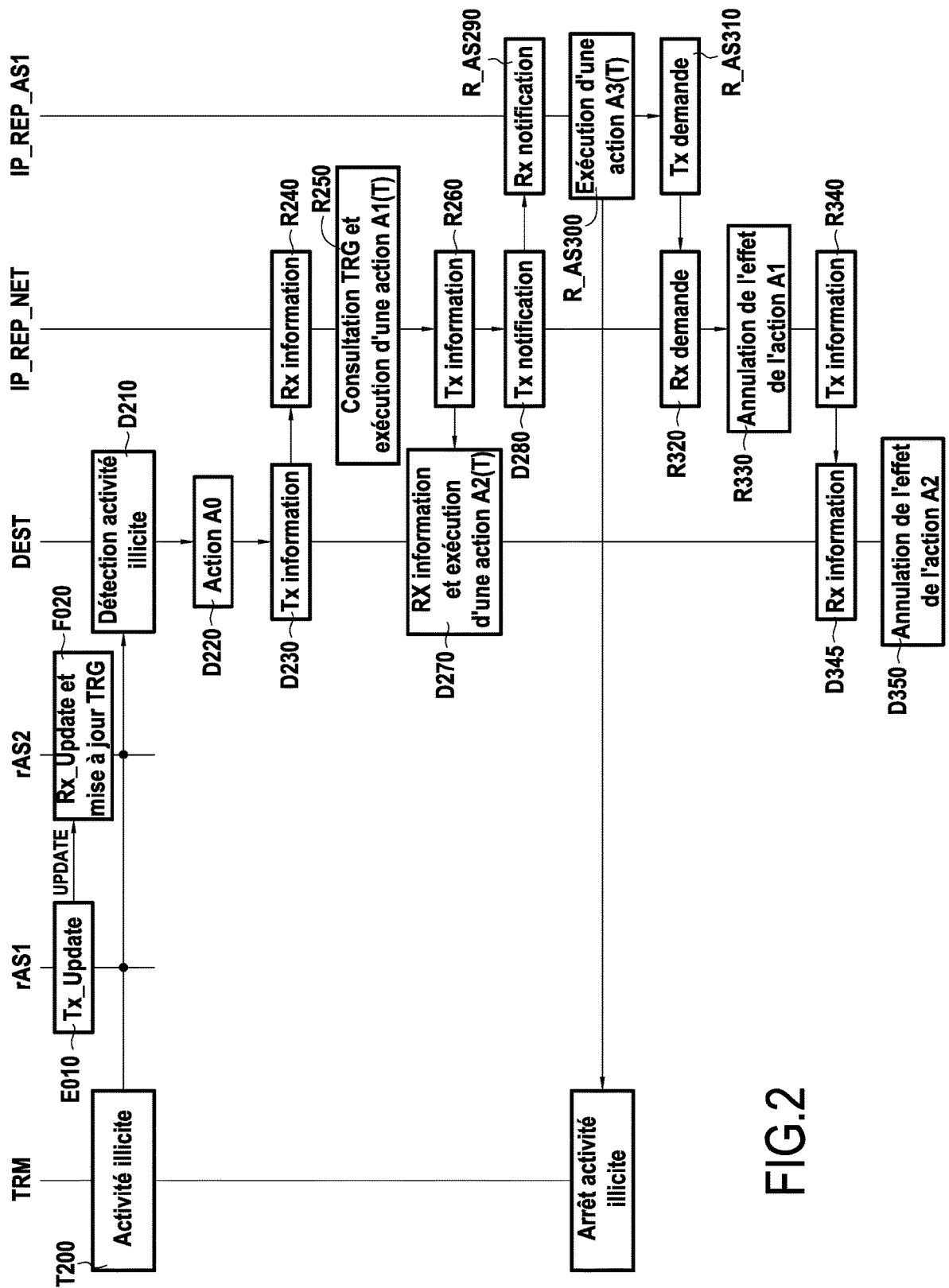
FIG. 2 is a timing diagram showing the steps of a method for sending an information item and a method for receiving an information item in a network activating the BGPSEC protocol in accordance with a first embodiment of the invention.

FIG. 2 is an example of a timing diagram showing steps of the methods of the invention in accordance with this embodiment. The order of the steps is provided as an example. Particularly, some steps can be triggered in an order other than that of FIG. 2. It should also be noted that some steps are not interdependent. For example, step R_AS310 can be triggered on the initiative of a reputation server IP_REP_AS independently of the reception of a notification from a reputation system IP_REP_NET.

The method for sending an information item is implemented by the router rAS1, with reference to step E010 described later.

The method for receiving an information item is implemented by the router rAS2, with reference to step F020 described later.

The method for receiving an information item is implemented by the content server DEST, with reference to step D270 described later.

The method for receiving an information item is implemented by at least one server of the network reputation system IP_REP_NET, with reference to steps R240, R250, R320 and R330 described later.

The method for receiving an information item is implemented by the IP reputation server IP_REP_AS1 of the first network AS1, with reference to steps R_AS290 and R_AS300 described later.

FIG. 2 shows various steps implemented in this example by the first equipment item TRM, the router rAS1, the router rAS2, the server DEST, a server of the reputation system IP_REP_NET and the reputation server IP_REP_AS1.

In this embodiment, the routing policy implemented within the network NET is based in particular on the activation of the BGPSEC protocol.

In this embodiment, the first and second networks AS1 and AS2 are autonomous systems.

It is recalled that the BGPSEC protocol is a secure version of the BGP protocol. The two protocols BGP and BGPSEC allow to advertise routes between the various autonomous systems (AS) that compose a network, for example the Internet network. The different routers in the network exchange UPDATE messages to advertise these routes.

It is recalled that an UPDATE message in accordance with the BGP protocol or with the BGPSEC protocol includes at least one mandatory attribute named "AS_PATH", which identifies the autonomous system(s) that a route advertised in the UPDATE message takes to reach one or more networks identified by their prefix.

It is recalled that an UPDATE message of the BGPSEC protocol also includes an optional attribute, called "BGPSEC_PATH". This attribute contains the information items contained in the AS_PATH attribute: a list of autonomous systems, as well as a list of signatures generated by routers of the autonomous systems listed in the AS_PATH attribute.

Unlike the BGP protocol, the BGPSEC protocol is used to check the integrity of a route advertisement. Indeed, the propagation of a route advertisement by the BGPSEC protocol through different AS supposes the establishment of a digital signature corresponding to each traversed AS. These signatures are added to the BGPSEC_PATH attribute of the UPDATE message.

In this embodiment, the routers rAS1 and rAS2 are ASBR (for "Autonomous System Border Router") border routers of the autonomous systems AS1 and AS2. The routers rAS1 and rAS2 are connected to each other and communicate according to the BGPSEC protocol.

During a step E010, the router rAS1 sends an UPDATE message to the router rAS2. Concretely, the router rAS1 inserts the BGPSEC_PATH attribute in the UPDATE message. The BGPSEC_PATH attribute then contains a single signature intended to guarantee the integrity of the advertisement and includes an information item on:
- the NLRI (for "Network Layer Reachability Information item") attribute describing the prefixes reached by the routes advertised in the UPDATE message, according to the state of the art;
- the number "1" of the AS emitting the UPDATE message, AS1, in accordance with the state of the art;
- the number "2" of the receiver AS, AS2, in accordance with the state of the art; and
- in accordance with the identification method according to the present invention, the size T of the prefix associated with the IP addresses assigned to equipment items connected to the set of networks NET via the first autonomous system AS1, and whose routes are advertised to the second autonomous system AS2 via the UPDATE message.

It is noted that the size T is that of a prefix associated with IP addresses assigned to equipment items connected to the first autonomous system AS1. This size is not that of a prefix described in the NLRI field of an UPDATE message.

For example, an NLRI field describes an IPv6 prefix with a length of 32 bits. The router rAS1 thus advertises the IPv6 prefix of length /32 in accordance with the state of the art but also an information item representative of the size /56 of the prefixes delegated to the customer equipment item connected to the autonomous system AS1, and which are extracted from the prefix /32. This advertisement indicates that this router is able to reach any address of the prefix 2001:db8::/32 and that the machines connected to the network of this ASBR are identified by addresses derived from prefixes of size 56.

For an IPv6 address, the size T of the associated IPv6 prefix typically has a value comprised between 0 and 64. However, values greater than 64 can be considered. A single attribute descriptive of the size T is associated with an IPv6 prefix as advertised by an UPDATE message used by the BGPSEC protocol or the BGP protocol.

The attribute of size T of the prefixes is used to determine the size of the prefix with which an IP address is associated.

In this embodiment, during step E010, the router rAS1 also adds, to the signature of the UPDATE message, an attribute which represents a duration D of allocation of the IP prefixes within the first autonomous system AS1, including the prefix allocated to the first equipment item TRM.

An "infinite" value can be used to indicate permanent allocation of the prefix.

A single attribute descriptive of the allocation duration D is associated with an IPv6 prefix advertised by an UPDATE message used by the BGPSEC protocol or the BGP protocol.

In this embodiment, during step E010, the router rAS1 also adds, to the signature of the UPDATE message, an attribute representing a reputation server identifier IP_REP_AS1.

During a step F020 and in accordance with the method for receiving an information item according to the present invention, the router rAS2 receives the UPDATE message from the router rAS1. From this message, the router rAS2 extracts the information item on the prefix size T assigned by the operator OP1, and optionally the duration D and the server identifier IP_REP_AS1, and updates the routing table TRG.

The receiving router rAS2 is configured to propagate the UPDATE message, adding a new signature to the BGPSEC_PATH attribute. This message will be sent to ASBR routers of AS to which AS2 is connected. The new signature guarantees the integrity of the content of the UPDATE message that was first digitally signed by the router rAS1.

This procedure is repeated from one autonomous system to another. This dissemination phase allows to advertise the information items of prefix size T, of IP resource delegation duration D, and of server identifier IP_REP_AS1 by the system AS1 to the other autonomous systems composing the set of networks NET.

In this embodiment, these information items are maintained in the global routing table TRG which logs all the routes available on the set of networks NET.

Using the BGPSEC protocol allows to build a table TRG for the set of networks NET that maintains structured records, for example as follows:
- a prefix allocated within the network NET, for example an IPv6 type prefix, such as 2001:db8::/32;
- an autonomous system AS number having allocated IP addresses of a block under this prefix;

a size T of the prefixes derived from this prefix, of length /32 in this example; and a duration D of validity of the addresses or prefixes derived from this prefix, of length /32 in this example, and allocated to the various equipment items connected to the first network AS1.

It is assumed that the user of the equipment item TRM wants to access the content of the server DEST of the second autonomous system AS2. According to the routing table TRG, the route between the equipment item TRM and the receiver device DEST passes through the routers rAS1 and rAS2.

During a step T200, the equipment item TRM generates an illicit activity, which does not comply with the charter for using the service provided by the server DEST, for example an attack on the content server DEST or a sending of spam to the server DEST.

The server DEST detects the illicit activity during a step D210.

The server DEST identifies and executes, during an optional step D220, an action A0 against the equipment item TRM.

This action A0 can consist in adding the IP address(es) associated with the equipment item TRM to a blacklist, or in limiting the traffic received from or to the equipment item TRM, or else in redirecting communications from the equipment item TRM to a dedicated portal.

During a step D230, the server DEST sends a message to the IP resource reputation system of the network, IP_REP_NET, to inform it of the detection of the illicit activity. The message includes the IP address(es) of the equipment item TRM. At least one server of the system IP_REP_NET receives this message during a step R240.

During a step R250 in accordance with the method for receiving an information item, the reputation system IP_REP_NET consults the table TRG by providing the IP address of the equipment item TRM and obtains information items about this address, such as the size T of its prefix, the duration D of its allocation and the identifier IP_REP_AS1 of the reputation server of the first system AS1.

At least one server of the system IP_REP_NET thus defines an action A1(T) depending on the size T and executes said action A1. This action A1 is updating its database, for example by adding the prefix of size T of the IP address of the equipment item TRM to its blacklist.

During a step R260, the server forming part of the reputation system IP_REP_NET transmits the information items retrieved from the routing table TRG concerning the prefix of size T to the content server DEST.

The server DEST receives these information items during a step D270.

Knowing the prefix size T of the IP address allocated by the operator OP1, the server DEST defines an action A2(T) depending on the size T and executes it against the equipment item TRM. For example, if the search for the information item (step R250) returns the prefix size 56 for the IIPv6 address "2001:db8::1/128" of the equipment item TRM, then the action A2 must take as input argument: "2001: db8::1/56". The information item representative of the size T allows the action required to restrict access to the equipment item TRM to be applied deterministically.

The action A2 cancels the effect of the action A0 previously executed in step D220.

The server DEST applies, for example, a filter using the size T and using the IP address of the equipment item TRM.

According to the previous example where the IP resource of the equipment item TRM is an IPv6 address whose prefix size T is 56 bits, the server DEST applies a filter on all the source IP addresses having bits identical to the first 56 bits of the IPv6 address of the equipment item TRM, as the first 56 bits.

Thanks to the invention, a malicious user of the equipment item TRM could not generate another IPv6 address to bypass the filter applied by the server DEST because the entire block of addresses sharing the same prefix is filtered.

In this embodiment, the server DEST obtains, during step D270, the duration D of delegation of the prefix of size T. The server DEST then associates a lifetime with its action. This lifetime is calculated on the basis of the duration D of the IP resource allocation. For example, if the prefix is allocated for 24 hours, the server DEST terminates its action at the end of the 24 hours.

Associating a lifetime with an action allows to rationalize the management of the filters installed by the server DEST and thus prevent access to the service from being restricted for another machine at the expiration of this lifetime.

In this embodiment, the system IP_REP_NET is informed, during step R250, that the equipment item TRM has an IP resource within the first autonomous system AS1.

During a step R280, the reputation system of the network IP_REP_NET sends a notification message NOTIF to the reputation server IP_REP_AS1 of the system AS1 to inform it that an action has been performed against a prefix allocated by the operator OP1.

In this embodiment, the notification message NOTIF includes the following information items:

a code CODE corresponding to an action executed by the reputation system IP_REP_NET when updating its database during step R250, for example:

0: Adding to a blacklist
  1: Removal from a blacklist
  2: Removal from a whitelist
  3: Adding to a whitelist
  4: Rate-limit
  the IP resource concerned by the action.
  the reason R_CODE for the action, for example:
  0: denial of service
  1: SPAM
  2: machine infected with a virus
  3: presence in a database of another reputation system Other information items, such as the timestamp of the allocation of the IP address to the equipment item TRM, can be communicated. The timestamp communicated in the notification message NOTIF allows the system AS1 to determine which customer TRM was responsible for the illicit action.

The server IP_REP_AS1 receives the notification message NOTIF during a step R_AS290. In this embodiment, the reputation server IP_REP_AS1 of the operator OP1 receives the notification message directly from the reputation system IP_REP_NET of the network.

The operator OP1 is then dynamically informed that the IP resource of the equipment item TRM has undergone at least one action (A1, A2) relating to its reputation.

The server IP_REP_AS1 is therefore informed that a block of IP addresses associated within the system AS1 is filtered, and can then react to this action.

During step R_AS290, the server IP_REP_AS1 identifies the equipment item TRM. The identification of the equipment item TRM (in the case of direct connection of the equipment item TRM to the network AS1) or of a network equipment item associated with the equipment item TRM (in the case of connection of the equipment item TRM to the network AS1 via an intermediate equipment item such as a CPE or an STB) can be done in collaboration with other functional modules of the system AS1. This identification results in obtaining an information item representative of the prefix size T of the IP address assigned to the terminal TRM within the network AS1.

During a step R_AS300, the server IP_REP_AS1 executes, according to a reputation policy, an action A3(T) defined depending on the size T. This action A3 can consist in:
- avoiding the allocation of the IP resource or the prefix included in the notification message NOTIF to a new customer;
- redirecting the traffic from the concerned equipment item TRM to an anti-virus platform;
- redirecting the traffic from the concerned equipment item TRM to a denial of service attack detection and mitigation platform;
- restricting access of the equipment item TRM to the service the system AS1; and/or
- requesting a monitoring platform to check whether communications have been emitted to the server DEST from the concerned IP resource.

Thanks to the invention, the operator OP1 is able to anticipate a degradation of service by avoiding allocating an IP address whose prefix is filtered, to a new equipment item that connects to the network NET.

Depending on the result of the action A3 executed by the autonomous system AS1, the server IP_REP_AS1 automatically undertakes a phase of negotiation with the reputation system IP_REP_NET to indicate that the IP resource, having been filtered, no longer represents threats and that measures were locally applied to comply with the charter of the remote server DEST.

During a step R_AS310, the server IP_REP_AS1 of the operator OP1 sends to the reputation server of the network IP_REP_NET a request message for canceling the effect of the action A1 executed by the system IP_REP_NET, for example a request for deleting the prefix of size T from the blacklist, which was assigned to the equipment item TRM, to avoid a degraded experience or an impediment to access to a service by a machine having the same prefix as the equipment item TRM.

In this embodiment, the message sent during step R_AS310 comprises the following information items:
- an identifier ID of a transaction established between the reputation system IP_REP_NET and the server IP_REP_AS1, this identifier is used by AS1 to unambiguously identify the corresponding request;
- a code corresponding to the request made to the reputation system IP_REP_NET, for example:
  - 0: request for removal from a blacklist,
  - 1: request for addition to a whitelist, or
  - 2: request for deleting all traffic conditioning associated with this resource;
- the IP resource concerned by the request. This IP resource can be a prefix or an IP address; and
- a justification for the request, for example:
  - 0: denial of service mitigation action implemented,
  - 1: anti-SPAM action implemented,
  - 2: anti-virus filtering action implemented, or
  - 4: contestation of the action described in a notification message NOTIF.

The reputation system of the network IP_REP_NET receives this request during a step R320.

In this embodiment, the reputation system IP_REP_NET decides, during a step R330, to accept the request emitted by the system AS1. Then, it cancels the effect of its action A1 by updating its database, for example by deleting from a blacklist, or by adding to a whitelist, the IP resource having been assigned to the equipment item TRM.

In this embodiment, the reputation system of the network IP_REP_NET relies on a mechanism for checking the authenticity of the received messages, to check whether an AS is legitimate to emit actions, for example an RPKI (for "Resource Public Key Infrastructure") type mechanism.

The system IP_REP_NET informs the server DEST of this update and sends it, during a step R340, a request to cancel the effect of the action A2 executed by the server DEST. The server DEST receives this request during a step D345 and cancels the effect of the action A2 during a step D350. Note that the update information item (R340) can be retrieved upon request from the server DEST.

The embodiment shown in FIG. 2 is particularly advantageous in a network using an IPv6 addressing and/or an IPv4 addressing with a Variable-Length Subnet Mask VLSM.

This embodiment where the BGPSEC protocol is used as a vector for advertising attributes of size T, of duration D and of identifier "IP_REP_AS1" advantageously benefits from the authentication and integrity checking functions offered by BGPSEC.

Implementation of the Methods of the Invention in a BGP Network

In one embodiment, the method for sending an information item and the method for receiving an information item are implemented in a network using the BGP protocol.

In this embodiment, the first and second networks AS1 and AS2 are autonomous systems.

The BGP protocol is used in a network NET to advertise routes between the various autonomous systems AS1 and AS2.

The router rAS1 adds in the AS_PATH attribute the prefix size T of a group of IP addresses allocated within the autonomous system AS1.

In one embodiment, the router rAS1 also adds to the AS_PATH attribute the duration D of size T prefix allocation and/or the identifier of the IP resource reputation server of the autonomous system AS1, IP_REP_AS1.

The methods of the invention include the same steps described previously in the case of the implementation of these methods in a network activating the BGPSEC protocol, except for the addition of attributes of BGPSEC_PATH type and their signatures.

Figure 3:
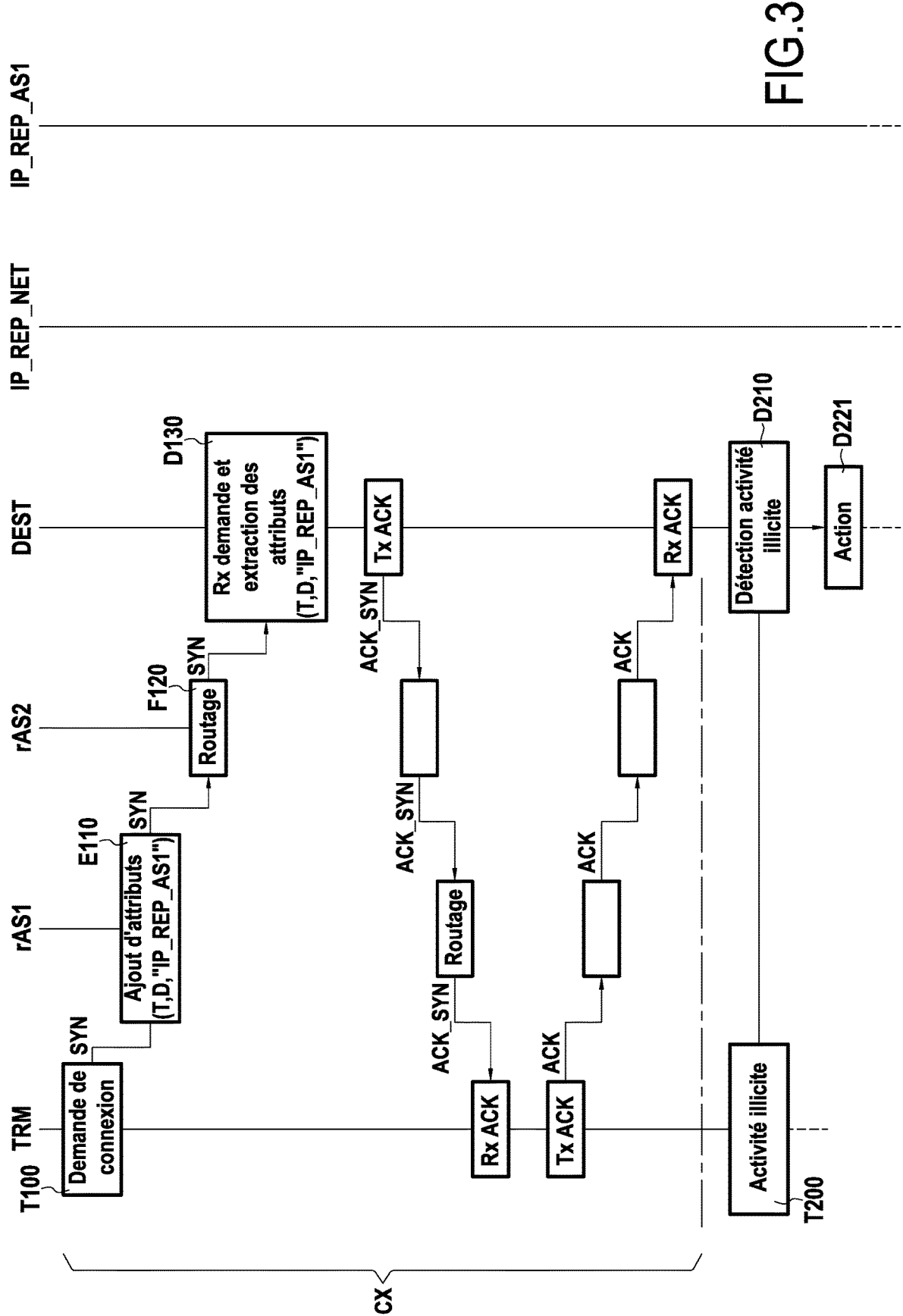
FIG. 3 is a timing diagram showing the steps of a method for sending an information item and a method for receiving an information item in a network capable of implementing a TCP communication, in accordance with a second embodiment of the invention.

Implementation of the Methods of the Invention in a Network Capable of Implementing TCP Communications FIG. 3 is a timing diagram showing steps of the method for sending an information item and of the method for receiving an information item, implemented in a network capable of implementing TCP (for "Transmission Control Protocol") communications and in accordance with one embodiment of the invention.

The method for sending an information item is implemented by the router rAS1, with reference to step E110 described later.

The method for receiving an information item is implemented by the content server DEST, with reference to step D221 described later and to step D270 as described for the implementation of the method in a network activating the BGPSEC protocol.

The method for receiving an information item is implemented by at least one server of the network reputation system IP_REP_NET, with reference to steps R250, R320 and R330 as described for the implementation of the method in a network activating the BGPSEC protocol.

The method for receiving an information item is implemented by the IP reputation server IP_REP_AS1 of the first network AS1, with reference to steps R_AS290 and R_AS300 as described for the implementation of the method in a network activating the BGPSEC protocol.

FIG. 3 shows various steps implemented in this example by the equipment item TRM, the router rAS1, the router rAS2, the server DEST, a server of the network reputation system IP_REP_NET and the IP resource reputation server IP_REP_AS1 of the first network AS1.

In this embodiment, the user of the equipment item TRM wants to access the content of the server DEST. For this purpose, a TCP connection must be established between the equipment item TRM and the server DEST. According to the routing table TRG, the route between the equipment item TRM and the server DEST passes through the routers rAS1 and rAS2.

During a TCP connection establishment phase CX and during a step T100, the equipment item TRM sends a connection establishment request in the form of a SYN (synchronization request) type packet to the server DEST.

During a step E110 and in accordance with the identification method according to the invention, the router rAS1 intercepts the SYN type message, adds to the SYN message an indicator which indicates the size T of the prefix of the IP address assigned to the equipment item TRM connected to the first network AS1, and sends the modified SYN message to the server DEST via the router rAS2 as indicated by the routing table TRG.

In this embodiment, during step E110, the router rAS1 also adds, to the SYN message, an indicator which represents a duration D of attribution of the prefix of size T.

In this embodiment, during step E110, the router rAS1 also adds, to the SYN message, an indicator which represents an identifier of the reputation server IP_REP_AS1.

During a step F120, the router rAS2 receives the SYN packet and forwards it to its destination, the server DEST.

During a step D130, the server DEST receives the SYN message and extracts the information item on the size T of the prefix from the IP address assigned to the equipment item TRM, the duration D of prefix allocation and the identifier of the server IP_REP_AS1. Optionally, the server DEST communicates the identification information items received in a TCP message to a reputation system IP_REP_NET which will then supply its reputation management table TRG.

The TCP connection establishment phase continues by sending an ACK/SYN message from the server DEST to the equipment item TRM to accept the synchronization request, and by sending an ACK message from the equipment item TRM to the server DEST to complete the control phase and finalize the establishment of the TCP connection. The steps relating to the exchange of ACK/SYN and ACK messages of the phase CX of establishing a TCP connection are known to the state of the art and not described here in detail.

It is assumed that the equipment item TRM is carrying out an illicit activity during a step T200 and that the content server DEST detects this illicit activity during a step D210.

During a step D221, the content server DEST defines depending on the size T an action against the equipment item TRM and executes it.

Step D221 is followed by steps D230 to D350, as described above with reference to the implementation of the methods of the invention in a network activating the BGPSEC protocol.

The embodiment shown in FIG. 3 is particularly advantageous in a network using IPv6 addressing and/or IPv4 addressing using a variable length subnet mask VLSM.

This embodiment shown in FIG. 3, where step E110 of the method takes place during the connection establishment phase, is particularly advantageous since it allows the second network AS2, upon initialization of the connection, to obtain the size T of the prefix allocated within the first network AS1 and to inform the IP resource reputation system IP_REP_NET as quickly as possible about any illicit activity.

Implementation of the Methods of the Invention in an IP Network Using a Specific Extended Header In one embodiment, the method for sending an information item and the method for receiving an information item are implemented in a network using the IP protocol.

The method for sending an information item is implemented by the router rAS1 or by the equipment item TRM.

In this embodiment and in accordance with the method for sending an information item according to the invention, the equipment item TRM or the router rAS1 adds to the IP packets emitted by the equipment item TRM an attribute representing the prefix size T of the source IP address of the equipment item TRM allocated within the first network AS1, before these IP packets leave the first network AS1.

The addition of the additional attribute, representing the size T of the prefix, is logged in a specific extended header EH in the case of the IPv6 protocol. This information item can be logged in the Options field of an IPv4 packet header.

In this embodiment, the equipment item TRM or the router rAS1 adds other additional attributes to the packets emitted by the equipment item TRM representing, for example, the duration D of prefix allocation, and/or an identifier of the IP resource reputation server IP_REP_AS1 of the first network AS1.

This step of sending the size T of the prefix according to the method allowing identification, can be followed by steps T200 to D350 similar to steps T200 to D350 of the implementation of the methods of the invention in a network supporting TCP connections.

The method for receiving an information item is implemented by the content server DEST, with reference to steps D221 and D270 as described for the implementation of the method in a network supporting TCP connections.

The method for receiving an information item is implemented by the network reputation server IP_REP_NET, with reference to steps R250, R320 and R330 as described for the implementation of the method in a network supporting TCP (or BGPSEC) connections.

The method for receiving an information item is implemented by the reputation server IP_REP_AS1 IP of the first network AS1, with reference to steps R_AS290 and R_AS300 as described for the implementation of the method in a network capable of implementing TCP (or BGPSEC) connections.

The advantages of the methods implemented in a network deploying the IPv6 protocol capable of operating the specific extended header mentioned above are identical to the advantages of their implementation in a network activating the BGPSEC protocol, as described above.

Other Embodiments

In one embodiment, a network equipment item DEST is connected to the network NET via a third network AS3. The equipment item DEST then has a source IP address assigned by an operator OP3. The reputation system and the server DEST are not connected to the same AS.

Figure 4:
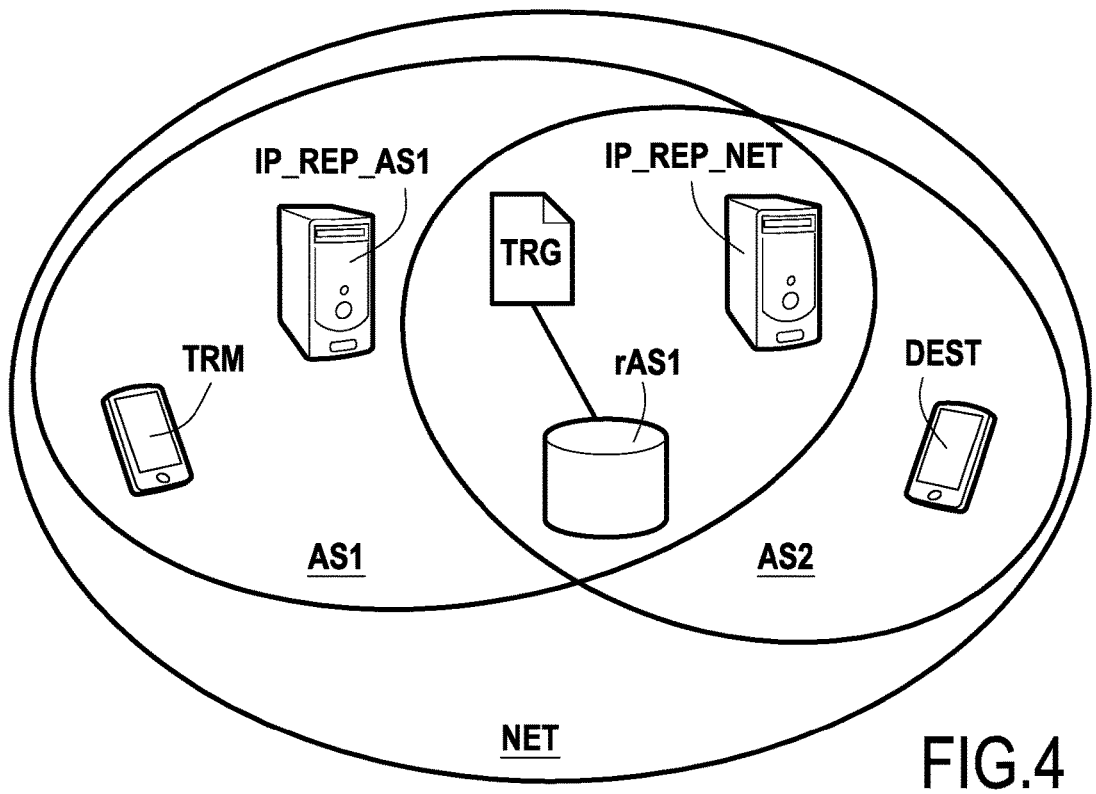
FIG. 4 illustrates a second network in which a method for sending an information item and a method for receiving an information item in accordance with the invention can be implemented in a particular embodiment.

In one embodiment, the first and second networks AS1 and AS2 are directly connected and share the same router rAS1 (or rAS2). FIG. 4 illustrates a network NET2 according to this embodiment of the invention.

In one embodiment, the reputation server IP_REP_AS1 of the first network AS1 is a module of the router rAS1.

In one embodiment, a server of the reputation system IP_REP_NET is the same network equipment item that hosts the global routing table TRG.

In one embodiment, the set NET of the first and second networks AS1 and AS2 includes several IP resource reputation systems.

In one embodiment, the first network AS1 has several reputation servers IP_REP_AS1. These several reputation servers IP_REP_AS1 are entered during step E010 or step E110.

In one embodiment, the reputation server IP_REP_AS1 of the first network AS1 has several identifiers. These identifiers are included in the attribute "IP_REP_AS1" sent during step E010 or step E110.

In one embodiment, the content server DEST and a reputation system of the network IP_REP_NET are co-located.

In one embodiment, the content server DEST is located in a network other than the second network.

In one embodiment, the information items of prefix size T, of IP resource delegation duration D, and of IP resource reputation server identifier IP_REP_AS1 are maintained in a dedicated table other than the global routing table TRG.

In one embodiment, the routing table TRG is maintained by dedicated systems other than the border routers rAS1 and rAS2.

In one embodiment of the implementation of the methods of the invention in a network capable of implementing TCP connections, the router rAS1 intercepts a packet sent by the equipment item TRM to the server DEST, other than the packet of the SYN type, in a step subsequent to the phase CX of establishing a connection.

In one embodiment, the first network AS1 has several prefixes. It emits as many UPDATE messages according to the BGP or BGPSEC protocol, each including a single NLRI. Each of the prefixes can be associated with specific values of prefix size T, of duration D of prefix allocation, and of reputation server IP_REP_AS identifier. These values can be different or the same for all prefixes.

In one embodiment, before the content server DEST provides a service to the equipment item TRM, the server DEST consults the database of the IP resource reputation system IP_REP_NET to check the reputation of this address. If this address is in a blacklist, the content server DEST may refuse to serve the equipment item TRM or perform additional controls to check that the equipment item TRM is not a robot or an infected machine.

In another embodiment relating to the application of the methods of the invention in a network capable of implementing TCP communications, the insertion of the identification information items, such as the size, the validity duration, the reputation server identifier, is not done systematically for all communications to the same server DEST. This embodiment assumes that the server DEST caches the information item received in a first SYN message for the validity duration indicated in this first message.

In one embodiment, following the detection (step D210), by the content server DEST, of an illicit activity, the server DEST directly informs the reputation system IP_REP_NET (step D230) without executing any action (without step D220 or D221).

In the embodiments shown in FIGS. 2 and 3, it is the content server DEST which detects an illicit activity and reports this detection. In another embodiment, a terminal equipment item detects an illicit activity and declares it to the IP resource reputation system of the network.

In one embodiment, after receiving (step R240) an information item on an illicit activity generated by the equipment item TRM, a server of the reputation system IP_REP_NET executes a prior action while the phase (step R250) of searching for additional information items is in progress. This action is optionally updated, at the end of step R250, when the search for additional information items is complete.

In one embodiment, at least one action from the action A2 defined by the content server DEST and the action A1 defined by a server of the reputation system IP_REP_NET depends on the identity of the first network AS1 within which the source IP address of an illicit activity has been allocated.

In one embodiment, the execution of the action A1 by a server of the system IP_REP_NET (step R250) is preceded by a step of requesting and a step of receiving at least one additional information item from the server DEST. The steps of requesting and receiving at least one additional information item can be executed several times until the end of a negotiation phase between the server of the system IP_REP_NET and the server DEST, in a similar manner to the negotiation phase NEGOT described later with reference to FIG. 5.

In one embodiment, the reputation server IP_REP_AS1 of the autonomous system AS1 receives the notification message NOTIF (step R_AS290) from the reputation system IP_REP_NET of the network via reputation servers of intermediate networks.

The exchanges between the system IP_REP_NET and the server IP_REP_AS1 are not direct in the event that the UPDATE type advertisements have been aggregated by intermediate networks. When the aggregation of UPDATE advertisements is activated, an intermediate network ASi informs an identifier of its own reputation server IP_REP_ASi as the point of contact for the aggregated prefix. However, an intermediate network ASi must keep in memory the information item of the server identifier IP_REP_AS1 as received from the source network AS1.

When an intermediate server IP_REP_ASi receives a notification message NOTIF, it consults its local routing table and relays the message to the server IP_REP_AS1 responsible for the IP resource contained in the notification message NOTIF. This operation is repeated until the notification message is received by the first network AS1 that owns the concerned resource. In another embodiment, the notification message NOTIF is only transmitted upon consultation, by the server IP_REP_AS1, of the system IP_REP_NET.

In another embodiment, the step R340 of transmitting an information item from the reputation system IP_REP_NET to the content server DEST is executed only upon consultation, by the server DEST, of the reputation system IP_REP_NET.

Figure 5:
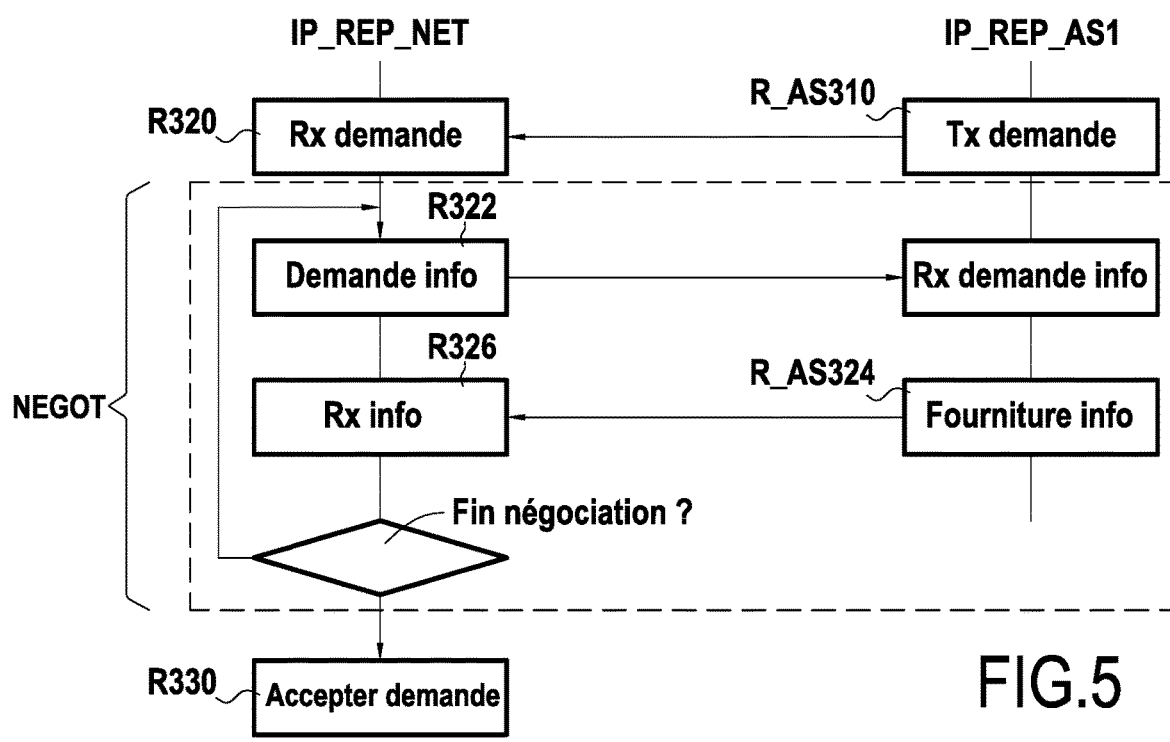
FIG. 5 is a timing diagram showing steps of a variant of the method for receiving an information item in accordance with one embodiment of the invention.

In one embodiment, illustrated by FIG. 5, when the reputation system of the network IP_REP_NET receives (during step R320) a request to modify the content of its database from the reputation system IP_REP_AS1, the system IP_REP_NET requests more information items from the server IP_REP_AS1. To this end, it sends it, during a step R322, a message including for example:

the identifier ID of the transaction established between the reputation system IP_REP_NET and the server IP_REP_AS1, as sent in the request; and a list of missing information items that will allow the reputation system IP_REP_NET to accept the request.

Upon receiving this message by the reputation server IP_REP_AS1, the latter IP_REP_AS1 responds, during a step R_AS324, with a message which includes the following arguments:

the transaction identifier ID, identical to the request identifier; and the list of missing information items requested by IP_REP_NET.

The reputation system of the network IP_REP_NET receives this response during a step R326.

One or more sendings of additional information item request/supply messages can be exchanged between the system IP_REP_NET and the server IP_REP_AS1 for a given resource. At the end of this negotiation phase NEGOT, the reputation system IP_REP_NET can decide, during step R330, to honor the request emitted by the first network AS1.

This embodiment illustrated by FIG. 5 can be implemented in a network activating the BGP or BGPSEC protocols, capable of implementing IP communications.

In one embodiment during step R330 (respectively D350), at least one server of the system IP_REP_NET (the server DEST) modifies an effect of the action A1 (A2) that it has executed during step R250 (D270). For example, if the action A1 was a restriction on the access of the terminal to a set of services provided within the set of networks NET, the action A1 is modified by a restriction to a reduced part of this set.

Figure 6:
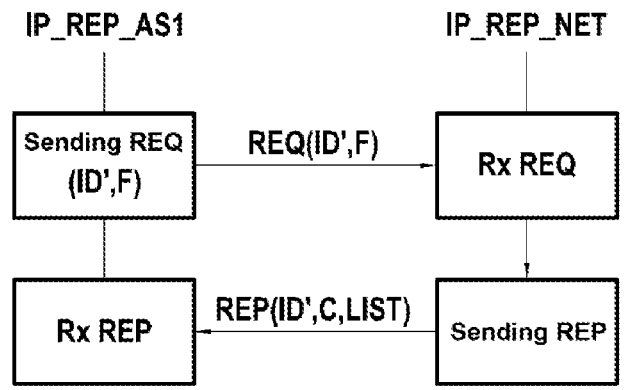
FIG. 6 is a timing diagram showing steps of a variant of the method for sending an information item in accordance with one embodiment of the invention.

In one embodiment, illustrated by FIG. 6, the reputation server IP_REP_AS1 of the first network AS1 sends a message REQ to the reputation system IP_REP_NET to request to retrieve a list of resources from an AS, including itself, for the purpose of checking the consistency or making the bases of these servers consistent.

In this embodiment, at least one server of the reputation system IP_REP_NET implements the method for sending an information item in accordance with the invention.

The message REQ may include:

an identifier ID' used to correlate the request REQ and the response REP; and a filter F, for example an IP address, a prefix, an AS number, etc.

The reputation system IP_REP_NET responds with a message REP including:

the same identifier ID' used to correlate the request REQ and the response REP;

a code C indicating whether the request was honored or failed, for example

0: success,
1: not compatible,
2: access denied, or
3: temporarily unavailable; and a list LIST of resources associated with the filter F of the request REQ, including the sizes T of IP prefixes.

This embodiment illustrated by FIG. 6 can be implemented in a network activating the BGP or BGPSEC protocols, capable of implementing TCP communications or any other IP network.

Description of the Emitter Device According to the Invention

The router rAS1 of the first network AS1 is an emitter device in accordance with the invention. This router rAS1 allows to send an information item representative of a prefix size of an IP address allocated within the first network AS1 in the network NET including the first network AS1 and at least one second network AS2.

The router rAS1 is characterized in that it is configured to send, to a receiver device of said second network AS2, a prefix size T associated with said IP address.

In one embodiment, the first router rAS1 also sends, to the receiver device, a duration D of prefix allocation and an identifier of an IP reputation server IP_REP_AS1 of the first network AS1.

The router rAS1 implements the method, described above, allowing to identify a first equipment item TRM.

In the embodiment where the network NET is a network activating the BGP protocol or the BGPSEC protocol, as described above, the receiver device is a router rAS2 of said at least one second network AS2.

In the embodiment where the network NET is a network capable of implementing TCP connections, or an IPv6 network using the resources of a specific extended header EH and as described previously, the receiver device can be a network equipment item, for example the content server DEST, or a terminal equipment item connected to the second network AS2.

Description of the Receiver Device According to the Invention

The invention relates to an equipment item, called a "receiver device", of the set of networks NET. The set NET includes the first network AS1 and at least the second network AS2. The receiver device allows the reputation management of IP resources of the network NET, and is configured for:

obtaining the prefix size T of an IP address assigned to the equipment item TRM connected to the first network AS1; and executing an action ACT(T) based on the size T.

It will be noted that the terminal item TRM can be directly connected to the network AS1 or via a connection device such as a CPE or a residential gateway.

Figure 7:
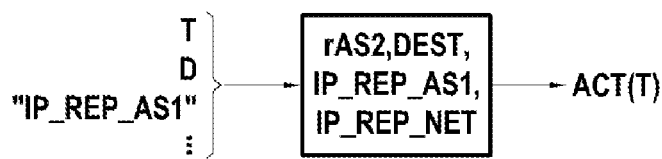
FIG. 7 illustrates the functional architecture of a so-called "receiver device" in accordance with the invention according to one embodiment.

FIG. 7 shows the functional architecture of the receiver device.

In one embodiment, the receiver device also obtains at least one information item from the duration D of attribution of said prefix and an identifier of the IP reputation server IP_REP_AS1 of the first network AS1.

The receiver device can be the second router rAS2. The router rAS2 obtains the size T during step F020 when the invention is implemented in a network activating the BGP or BGPSEC protocols. The router rAS2 defines and executes, depending on the size T, an action which is the update of the routing table TRG.

The receiver device can be the content server DEST. The server DEST obtains the size T in step D130 when the invention is implemented in an IP network. The server DEST defines and executes during step D221, depending on the size T, an action as described above.

The server DEST also obtains the size T during step D270 when the invention is implemented in a network activating the BGP or BGPSEC protocols, able to implement IP communications. The server DEST defines and executes, depending on the size T, an action during step D270.

The receiver device can be the IP resource reputation server IP_REP_AS1 of the first network AS1. The server IP_REP_AS1 obtains the size T during step R_AS290. In one embodiment, the server IP_REP_AS1 obtains a code defining a preliminary action executed against the first equipment item TRM and/or a timestamp information item. The server IP_REP_AS1 defines and executes, depending on the size T obtained, an action during step R_AS300.

The receiver device may be the IP resource reputation system IP_REP_NET of the network NET. At least one server of the system IP_REP_NET obtains the size T in step R240. In one embodiment, at least one server of the system IP_REP_NET obtains a code defining a preliminary action executed against the first equipment item TRM and/or a timestamp information item and/or the IP address of the equipment item TRM. At least one server of the system IP_REP_NET defines and executes, depending on the size T obtained, an action during step R250.

Also, a server of the system IP_REP_NET obtains the size T during the step R320, then defines and executes, depending on the size T obtained, an action during the step R330.

Figure 8:
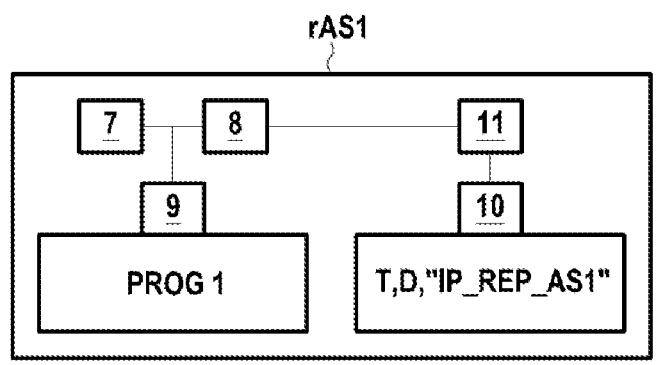
FIG. 8 illustrates the hardware architecture of a router in accordance with the invention according to one embodiment.

In the embodiment described here, the router rAS1 has the hardware architecture of a computer, as shown in FIG. 8.

The architecture of the emitter device rAS1 comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the router according to the invention constitutes a recording medium in accordance with the invention, readable by the processor 7 and on which is recorded here a computer program PROG1 in accordance with the invention.

The memory 10 of the router rAS1 allows to record variables used for the execution of the steps of the method for identifying a first equipment item TRM according to the invention, such as the prefix size T, the duration D of an IP resource allocation, and an identifier of the server IP_REP_AS1.

The computer program PROG1 defines functional and software modules here, configured to allow identifying a first equipment item TRM. These functional modules rely on and/or control the hardware elements 7-11 of the router rAS1 mentioned above.

Figure 9:
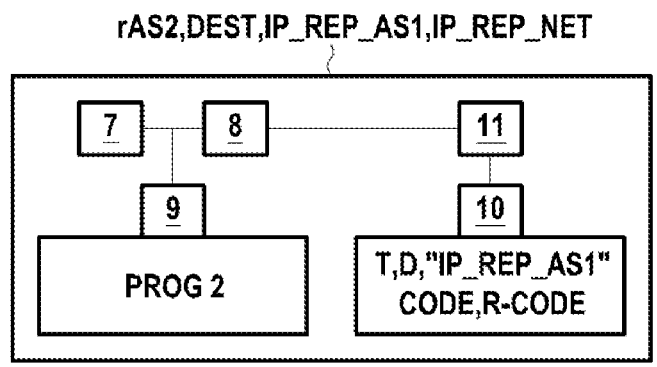
FIG. 9 illustrates the hardware architecture of a so-called "receiver device" in accordance with the invention according to one embodiment.

In the embodiment described here, the receiver device in accordance with the invention each has the hardware architecture of a computer, as illustrated in FIG. 9. The receiver device can be the second router rAS2, a server of the reputation system of the network, IP_REP_NET, or the reputation server of the first network IP_REP_AS1.

The architecture of the receiver device comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the receiver device according to the invention constitutes a recording medium in accordance with the invention, readable by the processor 7 and on which is recorded here a computer program PROG2 in accordance with the invention.

The memory 10 of the receiver device allows to record variables used for the execution of the steps of the method for receiving an information item according to the invention, such as the prefix size T, the duration D of an IP resource allocation, an IP reputation database, the code CODE of an action, the reason R_CODE of an action, etc. The computer program PROG2 defines functional and software modules here, configured to enable IP reputation management in a network. These functional modules rely on and/or control the hardware elements 7-11 of the receiver device mentioned above.

The invention claimed is:

1. A method for sending an information item in a set of networks, wherein the set of networks implements a reputation management of Internet Protocol (IP) resources and comprises at least a first network and a second network, said method being implemented by a device of said first network, called emitter device, and comprising:

said emitter device obtaining a size of a second prefix of IP addresses, wherein said second prefix is extracted from a first prefix of IP addresses allocated to the first network and is delegated to at least one equipment item connected to the first network, the at least one equipment item connected to the first network being identified by an IP address derived from the second prefix; and said emitter device sending to a device of said second network, called receiver device, an information item representative of the size of the second prefix and the first prefix in a single message, wherein said information item representative of the size of the second prefix is distinct from the second prefix, wherein:

the size of the second prefix is not fixed by the device of the second network;

the size of the second prefix is bigger than a size of the first prefix; and first bits of the second prefix are the same as first bits of the first prefix.

2. The method according to claim 1 further including said emitter device sending, to the receiver device, an information item representative of a duration of assignment of said second prefix.

3. The method according to claim 1 further including said emitter device sending, to the receiver device, an information item representative of an identifier of an IP resource reputation server of said first network, said server being configured to manage at least one list of IP resources associated with equipment items connected to the first network.

4. The method according to claim 1 wherein said emitter device and receiver device are routers communicating according to one of Border Gateway Protocol (BGP) or Border Gateway Protocol Security (BGPSEC) protocols and constructing a table including at least one information item representative of said second prefix size.

5. The method according to claim 1, wherein the IP address of the at least one equipment item connected to the first network is of Internet Protocol version 6 (IPv6) type or of Internet Protocol version 4 (IPv4) type with a variable length subnet mask.

6. The method according to claim 1, wherein the information item representative of the size of the second prefix is the size of the second prefix itself.

7. The method according to claim 1, wherein the information item representative of the size of the second prefix is obtained by a processing carried out on the size of the second prefix.

8. The method according to claim 1, wherein said size of the second prefix is not that of a prefix described in a BGP or BGPSEC UPDATE message that includes an Network Layer Reachability Information (NLRI) field, and the size of the second prefix is not included in the NLRI field.

9. A method for receiving an information item in a set of networks, wherein the set of networks implements a reputation management of Internet Protocol (IP) resources and comprises at least a first network and a second network, wherein a first prefix of IP addresses is allocated to the first network, said method being implemented by a device of said set of networks, called receiver device and comprising:

receiving an information item representative of a size of a second prefix of IP addresses and the first prefix in a single message, wherein said second prefix is extracted from the first prefix and is delegated to at least one equipment item connected to said first network, said information item representative of the size of the second prefix being distinct from the second prefix, the at least one equipment item connected to the first network being identified by an IP address that is derived from the second prefix and is of Internet Protocol version 6 (IPv6) type or of Internet Protocol version 4 (IPv4) type with a variable length subnet mask; and executing an action defined depending on said size of the second prefix, wherein:
the size of the second prefix is not fixed by a device of the second network;
the size of the second prefix is bigger than a size of the first prefix; and
first bits of the second prefix are the same as first bits of the first prefix.

10. The method according to claim 9 wherein said action comprises at least one action from:
an addition of an IP resource associated with said equipment item to a blacklist or to a whitelist, said IP resource being said second prefix or said IP address;
a removal of the IP resource associated with said equipment item from a blacklist or a whitelist;-a limitation of traffic exchanged with said equipment item;
a redirection of communications involving the IP resource associated with said equipment item to a dedicated portal; and
an update of a routing or IP resource reputation table.

11. The method according to claim 9 further comprising, following executing the action, cancelling an effect of said action, the canceling being triggered upon expiration of a lifetime of said action or upon reception of a request from a device configured for the reputation management of IP resources.

12. The method according to claim 11 wherein the canceling the effect of said action is preceded by requesting and receiving at least one additional information item from said device configured for the reputation management of IP resources.

13. The method according to claim 9 further comprising said receiver device obtaining at least one information item from:
said IP address of said equipment item;
an information item representative of a duration of assignment of said second prefix;
an identifier of an IP resource reputation server of said first network, said server being configured to manage at least one list of IP resources associated with equipment items connected to said first network and identified by an IP resource reputation system of said set of networks;
a code for identifying an action already performed by another device;
a reason for said action already performed by another device;
a list of IP resources associated with a filter; and
a timestamp information item on an assignment of the IP address of said equipment item.

14. A device, called emitter device, of a first network, said first network being capable of reaching a second network, said emitter device comprising:
a processor; and
a non-transitory computer-readable medium comprising instructions stored thereon which when executed by the processor configure the emitter device to:
obtain a size of a second prefix of Internet Protocol (IP) addresses, wherein said second prefix is extracted from a first prefix of IP addresses allocated to the first network and is delegated to at least one equipment item connected to the first network, the at least one equipment item connected to the first network being identified by an IP address derived from the second prefix; and
send, to a device of said second network, an information item representative of the size of the second prefix and the first prefix in a single message,
wherein:
said information item is distinct from the second prefix;
the size of the second prefix is not fixed by the device of the second network;
the size of the second prefix is bigger than a size of the first prefix; and first bits of the second prefix are the same as first bits of the first prefix.

15. The device according to claim 14, wherein the IP address of the at least one equipment item connected to the first network is of Internet Protocol version 6 (IPv6) type or of Internet Protocol version 4 (IPv4) type with a variable length subnet mask.

16. The device according to claim 14, wherein the information item representative of the size of the second prefix is the size of the second prefix itself.

17. The device according to claim 14, wherein the information item representative of the size of the second prefix is obtained by a processing carried out on the size of the second prefix.

18. A device of a set of networks, called receiver device, said set of networks comprising at least a first network and a second network, wherein a first prefix of Internet Protocol (IP) addresses is allocated to the first network, said receiver device comprising:
a processor; and
a non-transitory computer-readable medium comprising instructions stored thereon which when executed by the processor configure the receiver device to:
receive an information item representative of a size of a second prefix of IP addresses and the first prefix in a single message, wherein said second prefix is extracted from the first prefix and delegated to at least one equipment item connected to said first network, said information item being distinct from the second prefix, the at least one equipment item connected to the first network being identified by an IP address that is derived from the second prefix and is of Internet Protocol version 6 (IPv6) type or of Internet Protocol version 4 (IPv4) type with a variable length subnet mask; and
execute an action defined depending on said size of the second prefix,
wherein:
the size of the second prefix is not fixed by a device of the second network;

the size of the second prefix is bigger than a size of the first prefix; and first bits of the second prefix are the same as first bits of the first prefix.

19. The device according to claim 18, wherein the receiver device is selected from the group consisting of:

a network equipment item of said second network;

a server of an IP resource reputation system of said set of networks; and an IP resource reputation server of said first network.

* * * * *